United States Patent
Takeuchi

(10) Patent No.: US 6,728,498 B2
(45) Date of Patent: Apr. 27, 2004

(54) FIXING APPARATUS HAVING TEMPERATURE DETECTING DEVICE

(75) Inventor: Yasushi Takeuchi, Toride (JP)

(73) Assignee: Canon Kabushiki Kaisha, Tokyo (JP)

(*) Notice: Subject to any disclaimer, the term of this patent is extended or adjusted under 35 U.S.C. 154(b) by 34 days.

(21) Appl. No.: 10/096,252

(22) Filed: Mar. 13, 2002

(65) Prior Publication Data

US 2002/0186981 A1 Dec. 12, 2002

(30) Foreign Application Priority Data

Mar. 13, 2001 (JP) ......................................... 2001/070918

(51) Int. Cl.[7] .............................................. G03G 15/20
(52) U.S. Cl. ......................... 399/69; 399/328; 374/153
(58) Field of Search ............................ 219/216; 399/69, 399/320, 330, 328, 335, 33; 374/153, 208

(56) References Cited

U.S. PATENT DOCUMENTS

| 4,441,827 | A | * | 4/1984 | Coderre ........................ 374/153 |
| 4,821,062 | A | * | 4/1989 | Katoh et al. .................... 399/33 |
| 5,123,752 | A | * | 6/1992 | Paz-Pujalt et al. ........... 374/153 |
| 5,153,556 | A | * | 10/1992 | Hecht et al. ................... 338/25 |
| 5,281,793 | A | * | 1/1994 | Gavin et al. ................. 219/216 |
| 5,299,870 | A | * | 4/1994 | Moritani ...................... 374/153 |
| 5,366,291 | A | * | 11/1994 | Nakagama et al. .......... 374/153 |
| 5,475,200 | A | * | 12/1995 | Amico et al. ................ 219/471 |
| 5,765,075 | A |   | 6/1998 | Yamamoto .................... 399/69 |
| 6,167,216 | A | * | 12/2000 | Hori ............................. 399/69 |

FOREIGN PATENT DOCUMENTS

| DE | 196 00 211 | 9/1996 |
| JP | 57-172374 | 10/1982 |

* cited by examiner

*Primary Examiner*—Robert Beatty
(74) *Attorney, Agent, or Firm*—Fitzpatrick, Cella, Harper & Scinto

(57) ABSTRACT

A temperature detecting device includes a temperature detecting element for detecting a temperature of a member; a sheet covering the temperature detecting element and contactable to the member; wherein the sheet covering the temperature detecting element has a surface contactable to the member, the surface being of a glass fiber sheet coated with a resin material having a parting property.

12 Claims, 5 Drawing Sheets

FIXING APPARATUS HAVING TEMPERATURE DETECTING DEVICE

FIELD OF THE INVENTION AND RELATED ART

The present invention relates to a temperature detecting apparatus for detecting the temperature of a target object. It also relates to a fixing apparatus for thermally fixing an unfixed toner image to recording medium, which uses a temperature detecting apparatus.

FIG. 5 is an enlarged schematic view of a fixing roller 1 and a temperature sensor 6. As shown in FIG. 5, the temperature detection element 12 of the temperature sensor 6 is embedded in the temperature detection surface of the a protective member 13, which remains in contact with the fixing roller 1. The protective member 12 is generally formed of a spongy substance. In order to prevent the surface of the fixing roller 1 and the temperature detection element 12 of the temperature sensor 6 from being damaged by the friction resulting from the contact between the temperature sensor 6 and fixing roller 1, the surface of protective member 13, in which the temperature detection element 12 is embedded, and the surface of the temperature detection element 12, which faces the fixing roller 1, are covered with a piece of protective tape 14, which is formed of a highly lubricous substance. As for the conventional material for forming the protective tape 14, polyimide or the like has been used. The thickness of the spongy protective member 13 is 6 mm, and the thickness of the protective tape 14 is 20 μm. The temperature of the surface of the fixing roller 1 is detected by the temperature sensor 6, and the length of the time a heater 5 within the fixing roller 1 is kept turned on is controlled in response to the detected temperature so that the surface temperature of the fixing roller 1 remains at a target level.

The fixing roller 1 and an unshown pressure roller are kept pressed upon each other, forming a nip portion. As a piece of recording medium, onto which an unfixed toner image has just been transferred, is passed through the nip portion, the unfixed toner image is thermally fixed to the recording medium surface, turning into a permanent image.

In recent years, however, an image forming apparatus has drastically increased in speed. The higher the operational speed of an image forming apparatus, the greater the amount by which the surface temperature of the fixing roller drops as a substantial number of recording medium are continuously passed through the fixing apparatus, failing to conduct heat to the toner on the recording medium by a sufficient amount. Therefore, the so-called offset, that is, the phenomenon that toner adheres to the fixing roller, is likely to occur.

In the past, the offset toner adhered to the protective tape, which covered the temperature detection surface of the thermistor, and collected thereon. As the amount of the offset toner, which had collected on the protective tape covering the temperature detection surface of the thermistor, exceeded a certain amount, the collected offset toner dislodged, all at once, from the protective tape of the thermistor, and re-adhered to the toner image bearing surface of the recording medium which happened to be passing through the nip between the pressure roller and fixing roller, contaminating the image on the recording medium.

Further, since the offset toner adhered to the protective tape on the temperature detection surface, and collected thereon, there was a possibility that the surface temperature of the fixing roller would be incorrectly detected.

As a means for preventing the offset toner from adhering to the temperature detection surface of the thermistor, it is possible to place the temperature detecting member outside the recording medium path. This method, however, has its own problem. That is, in a case that a recording medium of a large size is passed immediately after a recording medium with a smaller size is passed, it is difficult to accurately estimate the temperature of the center portion of the fixing roller based on the temperature detected at the edge portion of the fixing roller. It is also possible to employ a noncontact type temperature detecting member. This method, however, is also problematic in that not only is a noncontact type temperature detecting member difficult to control but also high in cost.

SUMMARY OF THE INVENTION

The primary object of the present invention is to prevent toner from adhering to the temperature detection surface of the temperature sensor of a fixing member, so that it becomes possible to provide a fixing apparatus which does not suffer from the problems that an image is contaminated by the toner which collected on the temperature detection surface of the temperature sensor, and/or that the temperature of the fixing roller is incorrectly detected.

Another object of the present invention is to provide a temperature detecting apparatus, the temperature detection surface of which is covered with a glass fiber sheet coated with a sheet of resin film superior in releasing properties, across the surface which makes contact with an object, the temperature of which is to be detected.

Another object of the present invention is to provide a fixing apparatus comprising: a rotational member which makes contact with a sheet of recording medium bearing an unfixed image in order to fix the unfixed image to the recording medium: and a temperature sensor placed in contact with the rotational member to detect the temperature of the rotational member, wherein the surface of the temperature sensor, which faces the rotational member, is covered with a glass fiber sheet coated with a sheet of resin film superior in releasing properties, across the surface which faces the rotational member.

These and other objects, features, and advantages of the present invention will become more apparent upon consideration of the following description of the preferred embodiments of the present invention, taken in conjunction with the accompanying drawings.

DESCRIPTION OF THE PREFERRED EMBODIMENTS

Hereinafter, the a fixing apparatus and an image forming apparatus, in accordance with the present invention, will be described in more detail with reference to the appended drawings.

Embodiment 1

Figure 3:
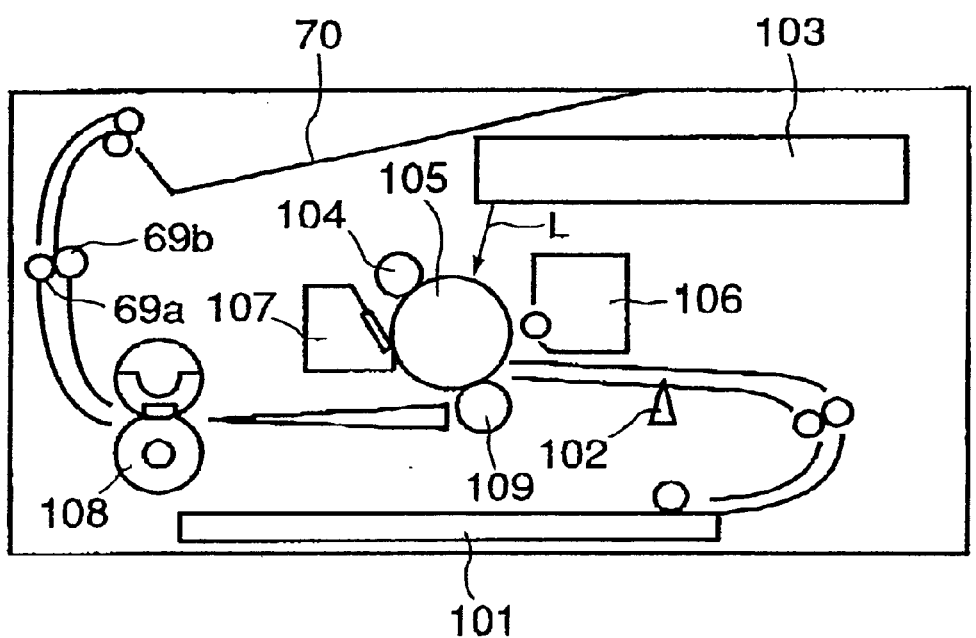
FIG. 3 is a schematic sectional view of an image forming apparatus in accordance with the present invention, for showing the structure thereof.

FIG. 3 shows the general structure of an electrophotographic image forming apparatus, that is, an example of an image forming apparatus in accordance with the present invention.

In this embodiment, a sheet of recording paper, or an example of recording medium, is fed into the main assembly of the image forming apparatus, out of a paper feeding cassette 101. As the recording paper is conveyed through the apparatus main assembly, the leading end of the recording paper is detected by a top sensor 102 positioned in the recording paper conveyance path. As the leading end of the recording paper is detected, an image begins to be formed on the peripheral surface of a photoconductive drum 105 which rotates in synchronism with the conveyance of the recording paper.

The peripheral surface of the rotating photoconductive drum 105 is uniformly charged by a charge roller 104. Then, the charged peripheral surface of the photoconductive drum 105 is exposed to a beam of exposure light L emitted, while being modulated with the image formation information, from a laser-based optical system 103. As a result, a latent image is formed on the peripheral surface of the photoconductive drum 105 in synchronism with the conveyance of the recording paper. To this latent image, toner is selectively adhered by a developing device 106, forming a toner image, or a visible image, on the peripheral surface of the photoconductive drum 105. The, such voltage that is opposite in polarity to the toner, is applied to a transfer roller 109, through the recording paper. As a result, the toner image on the photoconductive drum 105 is transferred onto the recording paper.

After being transferred onto the recording paper, the toner image, which is yet to be fixed, is fixed to the recording paper by being subjected to heat and pressure in a fixing apparatus 108.

Thereafter, the recording paper is further conveyed by a pair of conveying rollers 69a and 69b, and is discharged into a delivery tray 70 which constitutes a part of the top surface of the apparatus main assembly.

Meanwhile, the toner particles and paper dust remaining on the peripheral surface of the photoconductive drum 105 are removed by a cleaner 107.

Next, a thermal fixing apparatus, around which the present invention is centered, and which is employed, as the fixing apparatus 108, by the image forming apparatus shown in FIG. 3, will be described, regarding the portion of the fixing apparatus, which characterizes the present invention, more specifically, the material for a sheet which is for covering the temperature detection surface of the temperature sensor of the fixing apparatus 108, along with the thermistors as a temperature detection element, embedded in the temperature detection surface to detect the surface temperature of the fixing apparatus 108.

Figure 1:
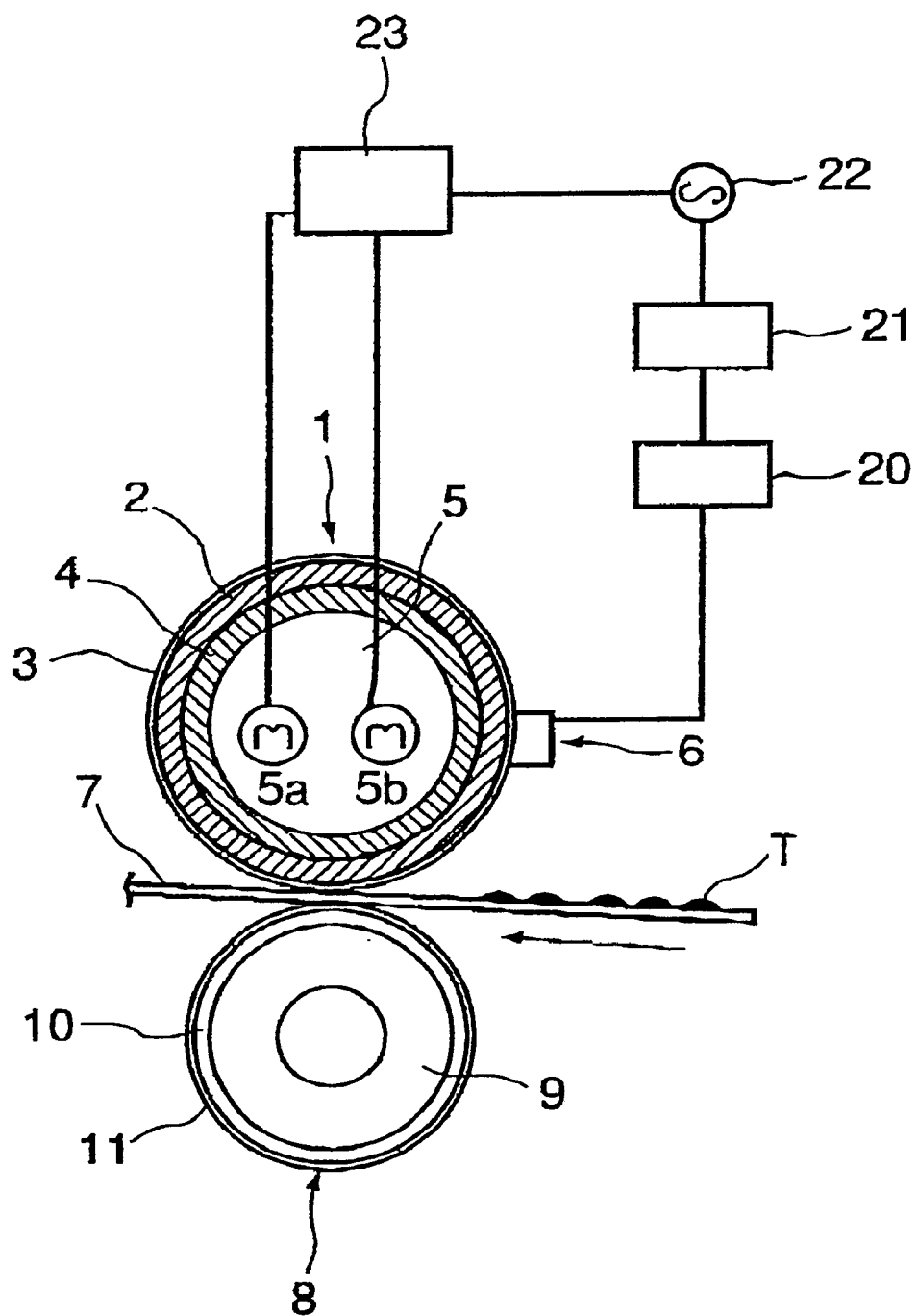
FIG. 1 is a schematic sectional view of a fixing apparatus in accordance with the present invention.

Referring to FIG. 1, the thermal fixing apparatus in this embodiment is an apparatus which welds an unfixed image formed on the recording medium 7, to the recording medium 7 by thermally melting the toner T of the unfixed image while the recording medium 7 is conveyed through the apparatus.

Also referring to FIG. 1, the fixing apparatus employed by the image forming apparatus comprises a fixing member 1 (fixing roller) as a heating means, and a pressing member 8 (pressure roller). The fixing member is a hollow rotational member, for example, in which a heater 5 is disposed. The pressing member 8 is also a rotational member. It is kept pressed upon the fixing roller 1, and conveys the recording medium 7 pinched between the fixing roller 1 and pressing member 8, while pressing the recording medium 7 against the beating portion of the fixing roller 1.

The fixing roller 1 comprises a hollow metallic core 4, a silicone rubber layer 2 formed on the peripheral surface of the metallic core 4, and a releasing layer 3. In FIG. 1, the metallic core 4 is formed of aluminum, and is 12 mm in thickness. The peripheral surface of the metallic core 4 is coated with the silicone rubber layer 2 with the interposition of an adhesive layer, and the thickness of the silicone rubber layer 2 is 250 $\mu$m. The peripheral surface of the silicone rubber layer 2 is coated with the releasing layer 3, which is 20 $\mu$m in thickness and is formed of a fluorinated substance. Normally, in consideration of the effectiveness with which the unfixed toner image T is fixed to the recording medium 7, fluorinated resin such as PTFE or PFA is used as the material for the releasing layer 3.

Within the hollow of the fixing roller 1, the heat 5, which is a halogen lamp, is stationarily disposed, so that the fixing roller 1 is heated by the radiant heat from the halogen lamp. The fixing apparatus is provided with a temperature sensor 6 for detecting the surface temperature of the fixing roller 1, which is kept pressed directly upon the peripheral surface of the fixing roller 1. The thermistor 12 detects the temperature of the fixing roller 1 based on changes in electrical resistance value, and the controlling apparatus turns on or off the halogen heater 5 in response to the detected temperature of the fixing roller 1, so that the temperature of the fixing roller 1 remains at a predetermined level.

The fixing apparatus shown in FIG. 1 has the pressure roller 8 as a pressing member, which is kept pressed directly upon the peripheral surface of the fixing roller 1, forming a nip. The pressure roller 8 conveys the recording medium 7 while pressing the recording medium 7 upon the fixing roller 1. It comprises a metallic core 9 formed of aluminum, and an elastic layer 10, that is, silicone rubber layer, which coats the metallic core 9. The thickness of the elastic layer 10 is 5 mm. The peripheral surface of the elastic layer 10 is coated with a releasing layer 11 for improving the releasing properties of the fixing roller 1. The releasing layer 11 is in the form of a piece of PFA tube, which is 100 $\mu$m in thickness.

The fixing apparatus 108 structured as shown in FIG. 1 is mounted in the image forming apparatus shown in FIG. 3 or the like. In operation, the recording medium 7, onto the surface of which an unfixed toner image T developed on the peripheral surface of the photoconductive drum 105 has been transferred, is conveyed into the fixing apparatus 108 by a conveying portion, and is passed through the nip portion formed by the fixing roller 1 and pressure 8, so that the toner image T on the recording medium 7 is fixed to the recording medium 7 by heat and pressure to form a permanent image.

Figure 2:
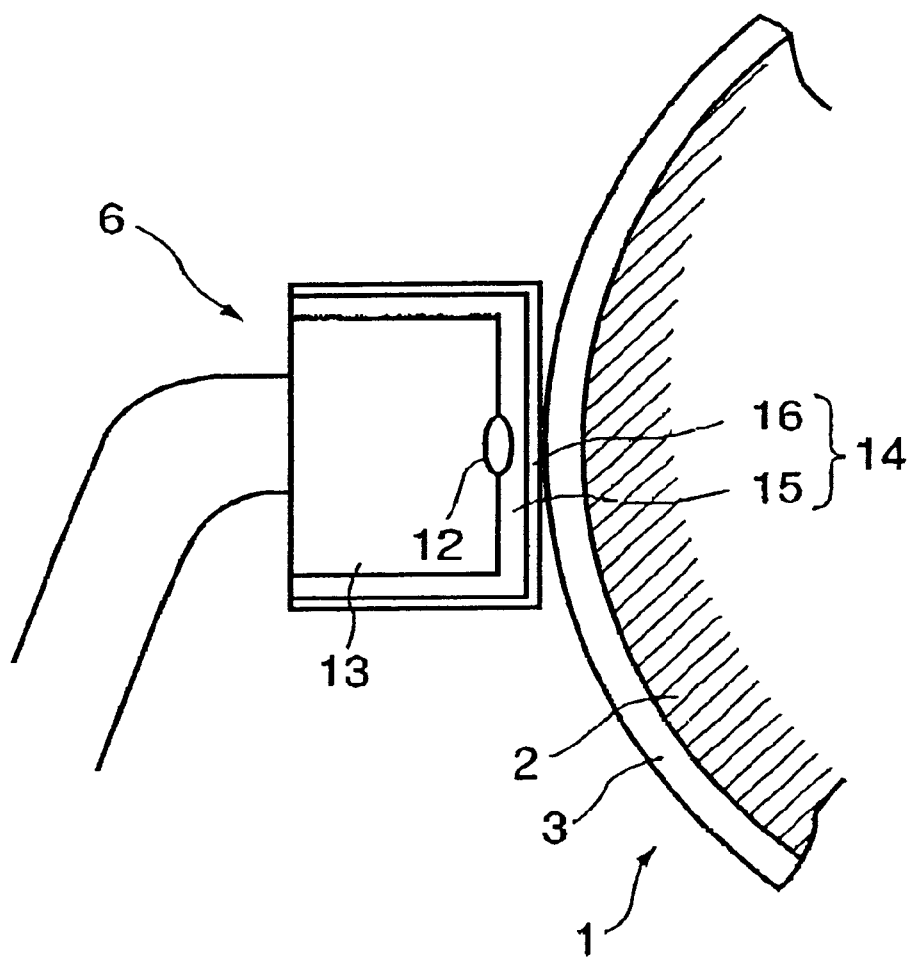
FIG. 2 is the temperature sensor of the fixing apparatus in accordance with the present invention, and its adjacencies.

Ordinarily, a thermistor is used as the temperature detection element of the temperature sensor for the fixing roller 1. In this embodiment, the temperature sensor shown in FIG. 2 is used. The basic structure of this temperature sensor is the same as that of the temperature sensor in accordance with the prior arts, except for the protective tape 14 coating the temperature detection surface of the thermistor 12. Next, the protective tape 14 in accordance with the present invention will be described. In the case of a fixing apparatus in accordance with the prior arts, a piece of polyimide tape is used as the material for the protective tape 14. In this embodiment, however; a glass fiber sheet 15, that is, a sheet formed by arranging a plurality of glass fibers into a sheet, preferably glass fiber cloth is used. Further, the glass fiber cloth sheet 15 is coated with a layer 16 of fluorinated resin superior in releasing properties, across the surface which faces the fixing roller 1. In other words, the glass fiber sheet 15, one of the surfaces of which is treated with the fluorinated resin 16 superior in releasing properties, is used as the material for the protective tape 14.

When a fixing apparatus, the protective tape 14 of which is formed of polyimide alone, such as the protective tape 14 in a fixing apparatus in accordance with the prior arts, is mounted in a high speed image forming apparatus or the like, toner is likely to offset to the fixing roller 1, because the temperature detection surface of the temperature sensor, which makes contact with the fixing roller 1 is insufficient in releasing properties. As toner offsets to the peripheral surface of the fixing roller 1, it adheres to the temperature detection surface of the temperature sensor, collecting thereon. Moreover, as the offset toner collects on the temperature detection surface of the temperature sensor, it is likely to transfer back onto the peripheral surface of the fixing roller 1. Eventually, the offset toner on the fixing roller 1 creates such problems that it transfers onto the recording medium 7, contaminating an image, and that it causes the surface temperature of the fixing roller 1 to be incorrectly detected. As the surface temperature of the fixing roller 1 is incorrectly detected, there is a possibility that an excessively large or small amount of electrical power will be supplied to the heating member 5, resulting in such a problem as fixation failure, because the amount of electrical power to be supplied to the heating member 5 is determined by the controlling apparatus in response to the surface temperature of the fixing roller detected by the temperature sensor.

Figure 5:
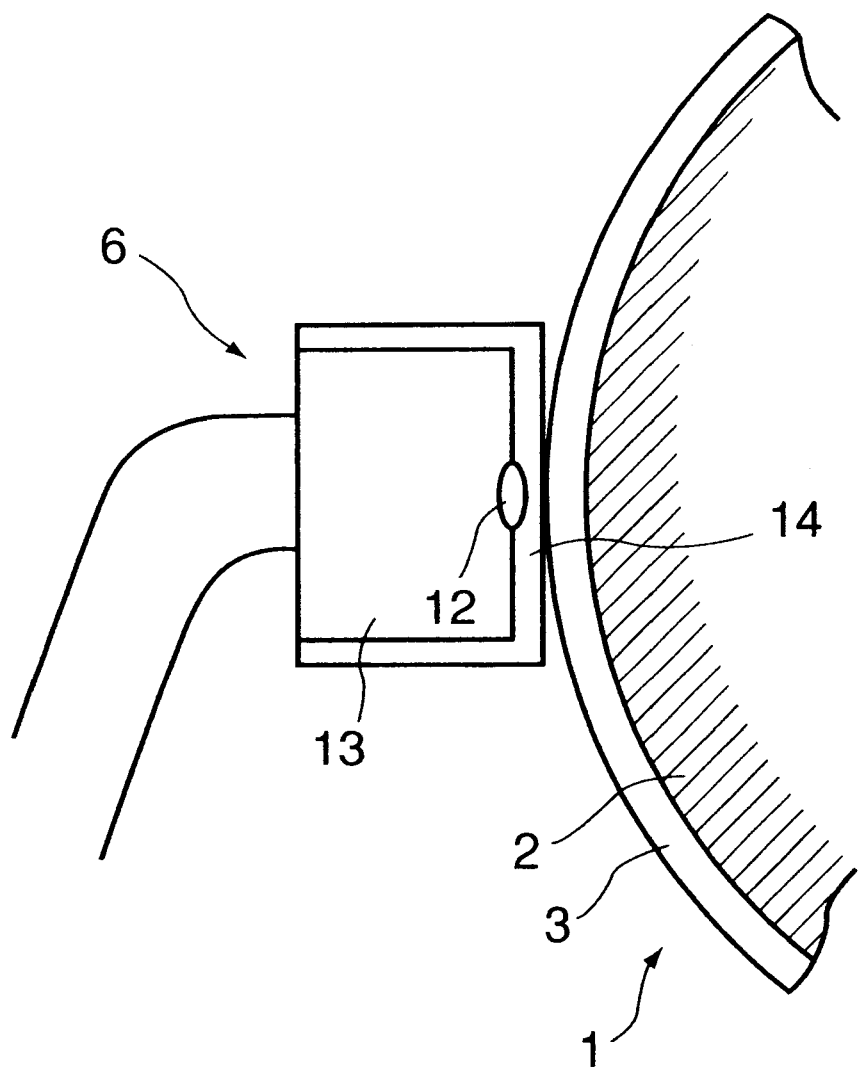
FIG. 5 is a schematic sectional view of the temperature sensor in an example of a fixing apparatus in accordance with the prior arts, and its adjacencies.

Thus, in this embodiment, in place of the polyimide tape, fluorinated resin tape such as PTFE tape or PFA tape, which was superior in releasing properties, was attached, as the protective tape 14, to the temperature sensor 6, as shown in FIG. 5. As a result, the temperature sensor 6 displayed excellent releasing properties; the offset toner was prevented from adhering to the surface of the protective tape 14, seemingly solving the above described problems. However, the fluorinated resin tape was inferior in durability. In other words, the protective tape 14 made up of fluorinated resin tape alone was easily shaved away by the fixing roller 1, failing to keep the temperature detection surface of the temperature sensor 6 superior in releasing properties for a long period of time.

This problem regarding the releasing properties and durability of the temperature detection surface of the temperature sensor 6 which makes contact with the fixing roller 1, was solved by using the glass fiber sheet 15 shown in FIG. 2, as the material for the protective sheet 14. More specifically, the glass fiber cloth sheet 15 was given a coat 16 of fluorinated resin, across the surface which was going to be faced toward the fixing roller 1, and the temperature detection surface of the temperature sensor 6 was covered with the glass fiber sheet 15 so that the fluorinated resin coated surface of the glass fiber sheet 15 faced the fixing roller 1.

In order to study the releasing properties and durability of the protective tape 14 which was for covering the temperature detection surface of the temperature sensor 6 of the fixing apparatus comprising the fixing roller 1, and which was covered with a releasing layer 3 formed of fluorinated resin, more specifically. PTFE, across the surface which faced the fixing roller 1 of a fixing apparatus, the inventors of the present invention carried out the following experiments.

Experiment 1

A fixing apparatus similar in structure to the fixing apparatus in FIG. 1 was mounted in an image forming apparatus (Canon GP605), and 5,000 sheets of low quality paper as recording medium 7 were continuously passed through the fixing apparatus. Then, the protective tape 14 which covered the temperature detection surface of the temperature sensor 6 similar in structure to the temperature sensor in FIGS. 2 and 4 was examined regarding the amount of contamination which had adhered to the protective tape 14, and the amount by which the protective tape 14 was shaved. As for the materials for the protective tape 14, five different materials were used, which were (a) polyimide sheet, (b) glass fiber cloth sheet, and which was not coated with PTFE, (c) PTFE sheet, (d) PFA sheet, and (e) glass fiber cloth sheet which was coated with PTFE. The results of the experiment are shown in Table 1.

TABLE 1

|  | (a) polyimide | (b) glass cloth | (C) PTFE | (d) PFA | (e) glass cloth + PTFE coating |
| --- | --- | --- | --- | --- | --- |
| contam'n | N | N | E | E | G |
| durability | G | N | N | N | G |

Contamination:
E: No contamination
G: trace amount of contamination
N: contaminated image
Durability:
G: No surface scraping
N: Thermister is scraped out, or fixing roller surface is damaged.

In terms of contaminant adhesion, the best materials for the protective tape 14 were (c) PTFE tape and (d) PFA tape, and the second best was the material made by coating the surface of the glass fiber sheet. The amount of the contaminants which were found on the recording medium after the recording medium was passed through the fixing apparatus was extremely small, creating no significant problem. In comparison, when (a) polyimide sheet and (b) glass fiber cloth sheet without coating, were used as the material for the protective tape 14 for the temperature sensor 6, the contaminants had adhered to the protective tape 14 by an amount large enough for the contaminants to dislodge from the protective tape 14 and contaminate the surface of the recording medium, on which an image was borne. In other words, the experiment proved that the surface of the protective tape 14, which faced the fixing roller 1, needed releasing properties.

In terms of durability, the best materials for the protective tape 14 were (a) polyimide sheet, and (e) PTFE coated glass fiber cloth sheet. When these sheets were used as the materials for the protective layer 14, the protective tape 14 was not shaved, and further, the surface layer 3 of the fixing roller 1 was not damaged. In comparison, when (b) glass fiber cloth sheet without PTFE coat was used as the material for the protective tape 14, the protective tape 14 itself was not shaved, but the surface layer of the fixing roller was damaged. When (c) PTFE sheet and (d) PFA sheet were used as the material for the protective tape 14, the protective tape 14 was shaved by an amount large enough to expose the protective member 13 of the temperature sensor 6, or the thermistor 12, before 500,000 sheets of recording medium were passed through the fixing apparatus. As a result, the friction between the protective member 13 of the temperature sensor 6, and fixing roller 1, became severe enough to damage the peripheral surface of the fixing roller 1.

When the fixing roller 1 was provided with the surface layer 3 of fluorinated resin, and the temperature detection surface of the temperature sensor 6 was covered with the protective tape 14 formed of the glass fiber sheet 15 coated with the layer 16 of fluorinated resin across the surface which faced the fixing roller 1, the offset toner did not collect on the protective tape 14 while a large number of sheets of recording medium were continuously passed through the fixing apparatus. Further, even after the continuous passage of 500,000 sheets of recording medium, the surface layer of the fixing roller 1 and the temperature detection surface of the temperature sensor 6 did not damage each other, assuring that satisfactory images were always formed.

At this time, a case in which the conventional polyimide tape is coated with the fluorinated resin tape, for example, PTFE tape or PFA tape, which is superior in releasing properties, will be mentioned. As is evident from Table 1, polyimide is superior in durability, but is inferior in contaminant rejection. On the other hand, PTFE tape and PFA tape are superior in contaminant rejection, but are problematic in durability. Thus, when the polyimide sheet coated with a sheet of fluorinated resin film is used as the material for the protective tape 14, the fluorinated resin layer is shaved away, exposing the polyimide layer, during the early stage of the fixing apparatus usage. As a result, unsatisfactory images begin to be produced during the early stage of the fixing apparatus usage, because the polyimide is inferior in contaminant rejection. Of course, it is possible to increase the thickness of the fluorinated resin layer. However, the increase in the thickness of the fluorinated resin layer reduces thermal conductivity, making it impossible for the thermistor 12 of the temperature sensor 6 to accurately detect the surface temperature of the fixing roller 1. Therefore, the thickness of the fluorinated resin layer should not be increased.

Also in a case in which the glass fiber cloth sheet is coated with a layer of fluorinated resin film, the fluorinated resin layer is shaved away during the early stage of the fixing apparatus usage. However, for the following reason, the glass fiber cloth sheet coated with fluorinated resin is capable of preventing the contaminants from adhering to its surface, even after the surface coat of the fluorinated resin is shaved away. That is, the glass fiber cloth sheet was formed by arranging the glass fibers into a cloth-like fashion. Therefore, its surface has a roughness value of 10–100 $\mu$m. The glass fiber cloth sheet itself was not shaved as easily as the fluorinated resin layer. Therefore, even after the surface layer of fluorinated resin was shaved away, there remains fluorinated resin in the numerous grooves in the surface of the shaved glass fiber cloth sheet coated with fluorinated resin. This remaining portion of the fluorinated resin in the grooves, along with the glass fibers, is capable of keeping the amount of the contaminants at a level at which the contaminants does not significantly damage images, admittedly that in terms of contaminant rejection, the combination of the glass fibers and the fluorinated resin remaining in the grooves among the glass fibers is not as effective as the intact, or unshaved, fluorinated resin layer itself. Further, the glass fiber cloth sheet coated with fluorinated resin is capable of keeping the damage to the fixing roller at a level low enough to give the fixing roller a service life of a satisfactory length.

Also in the case of polyimide tape coated with a layer of fluorinated resin film, the fluorinated resin layer is shaved away as in the case of the glass fiber sheet coated with a layer of fluorinated resin film. Thus, it is possible to make the surface of the polyimide tape rougher. However, as polyimide rubs against the peripheral surface of the fixing roller, it is reduced in the surface roughness. Therefore, the effect of the increased surface roughness cannot be maintained for a sufficient length of time. In other words, the temperature detection surface of the temperature sensor begins to be contaminated during the early stage of the fixing apparatus usage.

As is evident from the above description, it is the protective tape formed of the glass fiber cloth sheet coated with a layer of fluorinated resin film that is satisfactorily effective in terms of contamination rejection and durability.

It is evident from Table 1 regarding the amount of the toner which had adhered to the temperature detection surface, the durability of the fixing roller 1, and the durability of the temperature detection surface of the temperature sensor 6 which makes contact with the fixing roller 1, that the best material for the protective tape 14 for covering the temperature detection surface of the temperature sensor 6 is the glass fiber cloth sheet 15 coated with the layer 16 of fluorinated resin, in particular, PTFE.

Further, the fixing roller 1 is provided with the releasing layer 3, as the surface layer, which is a layer of fluorinated resin. With the peripheral surface of the fixing member, that is, the surface with which the temperature detection surface of the temperature sensor 6 makes contact, coated with fluorinated resin, in particular, PTFE, the fixing member is superior in releasing property, better preventing toner from adhering to the peripheral surface of the fixing member. Further, with the provision of the releasing layer 3, the temperature detection surface of the temperature sensor, and the peripheral surface of the fixing member, do not frictionally damage each other, enhancing the effects of the protective tape 14 formed of the glass fiber sheet 15 coated with the layer 16 of fluorinated resin.

To sum up, according to this embodiment of the present invention, the releasing layer of the fixing member of the fixing apparatus is formed of fluorinated resin, and the temperature detection surface of the thermistor, which is placed in contact with the fixing roller to detect the surface temperature of the fixing roller, is covered with the glass fiber cloth sheet, and which is coated with a layer of fluorinated resin, in particular, PTFE. Therefore, the offset toner does not collect on the temperature detection surface of the temperature sensor 6 or does not adhere to the fixing roller. Therefore, the problems that images are soiled by the offset toner from the fixing roller, and that the surface temperature of the fixing roller is incorrectly detected due to the presence of the offset toner on the surfaces of the fixing roller and/or the temperature detection surface of the temperature sensor, do not occur. Further, the problem regarding the durabilities of the protective tape and fixing roller does not occur.

Further, in this embodiment, the glass fiber cloth sheet, which is coated with fluorinated resin, in particular, PTFE, to be used as the material for the protective tape 14, may be replaced with fiber glass mat, or another fiber glass sheet. Moreover, the resinous substance, which is superior in releasing properties, and is used for coating the glass fiber cloth sheet as the material for the protective tape 14, and the fluorinated resin used as the material for the releasing layer of the fixing member, may be a resinous substance other than PTFE.

At this time, a method for controlling the power supply to the heating member 5 will be described.

A referential code 20 stands for a DC circuit. The signal outputted from the temperature sensor 6 is converted into the surface temperature of the fixing roller 1 by the DC circuit 20. Thereafter, DC-CPU 21 outputs a driving signal to each heating member. More concretely, it determines whether a driving signal is to be outputted to the heating member 5a, heating member 5b, or both heating members 5a and 5b. Whether the heating member 5 is to be driven or not is determined based on the difference between the actual surface temperature of the fixing roller 1 and a predetermined temperature, for example, 190° C. When the difference is no less than 20° C., electrical power is supplied to both heating members 5a and 5b, and when the difference is no less than 10° C., but not more than 20° C., electrical power is supplied only to heating member 5a. When the difference is no more than 10° C., electrical power is supplied only to the heating member 5b. Designated by a referential code 22 is an electrical power source, which normally is an AC power source. Designated by a referential code 23 is an SSR, which determines which of the heating members 5 and 5b is to be supplied with electrical power. Described above is only one example of a control circuit for providing the heating member 5 with electrical power: the present invention is compatible with a control circuit other than the above described one.

The application of the present invention is not limited to a fixing apparatus structured as described above. More specifically, it does not need to be limited to a fixing apparatus having a fixing member such as the rotational, hollow, metallic roller in Embodiment 1; the fixing member may be in the form of a belt, a cylindrical film, or a solid thermal roller. The heating means does not need to be limited to a halogen lamp; it may be a xenon lamp, an infrared lamp, or the like, which provides radiant heat, a contact type ceramic heater, or an induction type heating member, the induction coil of which is connected to a high frequency power source. In other words, the present invention is effectively applicable to various thermal fixing apparatuses different in heating means.

In the above description of the embodiment of the present invention, the present invention was described with reference to only the temperature sensor of the rotational fixing member. However, the present invention is applicable to all fixing members provided with a heating means. For example, in the case of a fixing apparatus in which the pressing member is also enabled to provide heat (two-sided heating method), this pressing roller is thought as a fixing member capable of doubling as a pressing member. In this case, therefore, it is reasonable to provide the pressing member with a temperature sensor, the temperature detection surface of which is covered with a protective tape formed of glass fiber cloth sheet which is coated with fluorinated resin. In addition, effects similar to those described above can be obtained even if the present invention is applied to a thermal fixing apparatus having a flat nonrotational fixing member or the like.

Figure 4:
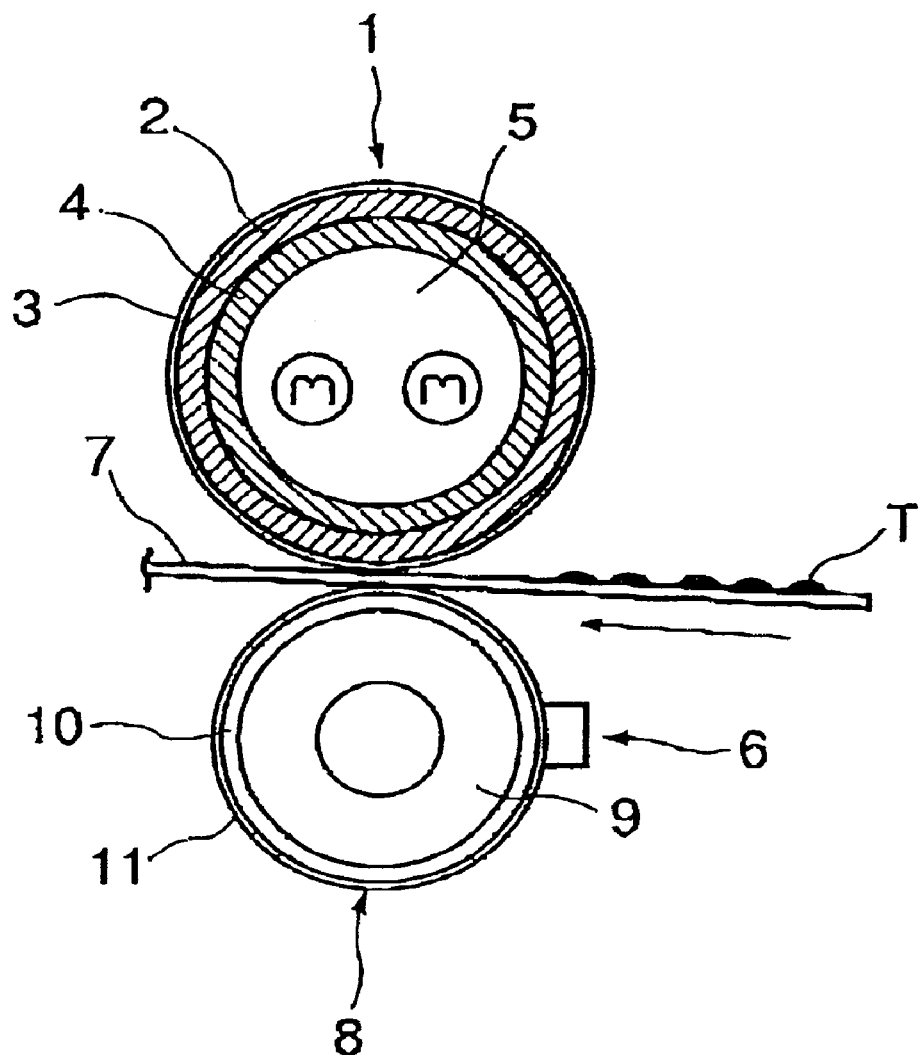
FIG. 4 is a sectional view of another fixing apparatus in accordance with the present invention.

Referring to FIG. 4, the fixing apparatus in this drawing is made up of the fixing roller 1 having a heating member, and a pressure roller having no heating member. In this fixing member, the amount of the electrical power supplied to the heating member is controlled by detecting the surface temperature of the pressing roller with the use of the temperature sensor 6. The present invention is also effectively applicable to the temperature sensor 6 of this fixing apparatus, because there is a strong possibility that the offset toner adheres to the fixing roller 1, transfers therefrom onto the peripheral surface of the pressure roller 8 due to the contact between the fixing roller 1 and pressure roller 8, and eventually adheres to the thermistor for detecting the surface temperature of the pressure roller.

It is possible to use a temperature sensor in accordance with the present invention as a temperature detecting means for an apparatus other than a fixing apparatus. For example, in the case of a color copying machine in which a plurality of toner images different in color are developed, transferred, and fixed, a temperature sensor in accordance with the present invention can be effectively used for the following purpose. In an ordinary color copying machine, toner images formed on the photoconductive member are temporarily transferred onto the intermediary transfer medium, before they are transferred onto the recording medium and are fixed to the recording medium. In this case, in order to apply optimum transfer voltage to the transfer belt, as the intermediary transfer member, in response to the electrical resistance of the transfer belt which varies in response to the temperature of the transfer belt, the surface temperature of the transfer belt is detected, and the amount of the transfer voltage is varied in response to the detected surface temperature of the transfer belt. In the case of this type of control system, a temperature sensor in accordance with the present invention is effectively used as the temperature detecting means for detecting the surface temperature of the transfer belt, for the following reason. After the transfer of toner images onto the recording medium, a certain amount of toner (residual toner) remains on the transfer belt as an intermediary transfer member. Therefore, there is a possibility that the residual toner will adhere to the temperature sensor placed in contact with the transfer belt to detect the surface temperature of the transfer belt, preventing the surface temperature of the transfer belt from being accurately detected. However, the employment of a temperature sensor in accordance with the present invention reduces the amount by which the residual toner adheres to the interface between the transfer belt, as an intermediary transfer member, and temperature sensor, making it possible to keep the transfer performance of the transfer belt at a satisfactory level.

As described above, the present invention relates to a thermal fixing apparatus which has a fixing member provided with a heating means, and a contact type temperature sensor, the temperature detection surface of which is placed in contact with the fixing member to detect the surface temperature of the fixing member, and in which a piece of recording medium, on the surface of which an unfixed toner image is borne, is placed in contact with the fixing member to fix the unfixed toner image to the recording medium, as a permanent toner image. It is characterized in that the temperature detection surface of the temperature sensor is covered with a glass fiber sheet coated with a resinous substance superior in releasing properties across the surface which faces the fixing member. Therefore, in a thermal fixing apparatus in accordance with the present invention, the offset toner does not adhere to the temperature detection surface of the temperature sensor, eliminating the problems that image are soiled by the offset toner, that the surface temperature of the fixing member is incorrectly detected, and that the surface layer of the fixing member and the temperature detection surface of the temperature sensor are both shaved by the friction between them. Therefore, it is possible to always produce images of satisfactory quality.

While the invention has been described with reference to the structures disclosed herein, it is not confined to the details set forth, and this application is intended to cover such modifications or changes as may come within the purposes of the improvements or the scope of the following claims.

What is claimed is:

1. A temperature detecting device comprising:
   a temperature detecting element for detecting a temperature of a member;

a sheet covering said temperature detecting element and provided at a side thereof contacting the member with a resin coating having a high parting property, wherein said sheet comprises glass fibers which are woven therein.

2. A device according to claim 1, wherein the resin material is fluorine resin material.

3. A device according to claim 1, wherein said temperature detecting element is in contact with a glass fiber sheet.

4. A device according to claim 1, wherein said temperature detecting element is in contact with the sheet having the parting property.

5. An image fixing apparatus comprising:

a rotatable member contactable to a recording material carrying an unfixed image to fix the unfixed image on the recording material;

a temperature detecting element for detecting a temperature of said rotatable member;

a sheet covering said temperature detecting element and provided at a side thereof contacting the member with a resin coating having a high parting property, wherein said sheet comprises glass fibers which are woven therein.

6. An apparatus according to claim 5, wherein the resin material is fluorine resin material.

7. An apparatus according to claim 5, wherein said temperature detecting element is in contact with a glass fiber sheet.

8. An apparatus according to claim 5, wherein said temperature detecting element is in contact with the sheet having the parting property.

9. An apparatus according to claim 5, wherein said glass fiber sheet is a glass cloth fiber sheet.

10. An apparatus according to claim 5, wherein said rotatable member, a temperature of which is to be detected by said detecting element, has a parting layer.

11. An apparatus according to claim 5, further comprising heating means for heating at least a part of said rotatable member, a control circuit responsive to an output signal of said temperature detecting element for controlling electric power supply to set heating means.

12. An image forming apparatus comprising:

an image fixing apparatus as defined in claim 5;

a photosensitive member for forming a latent image of image information;

a developing device for supplying toner to the latent image; and a transfer device for transferring the toner from said photosensitive member onto the recording material.

* * * * *